United States Patent Office 3,442,071
Patented May 6, 1969

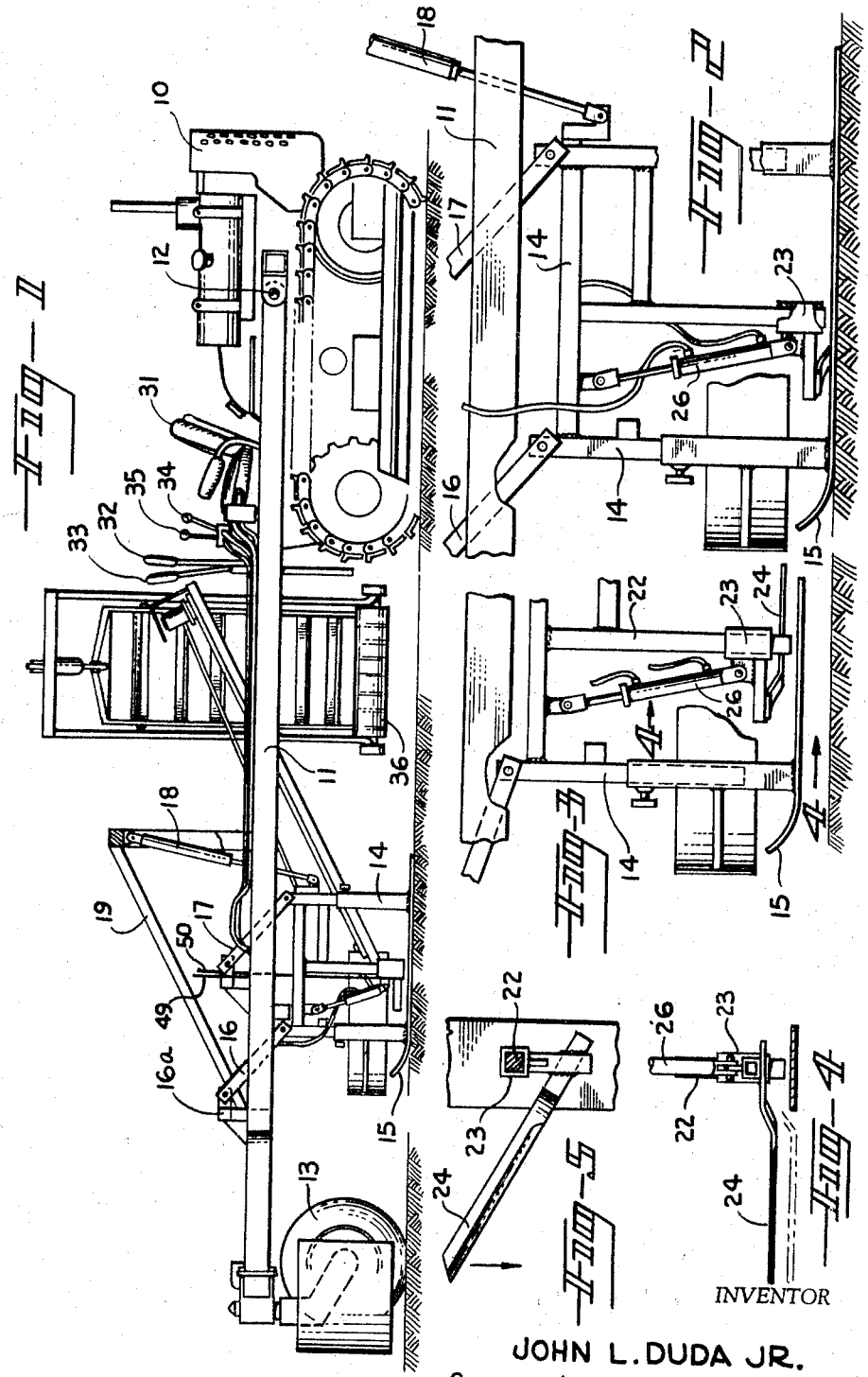

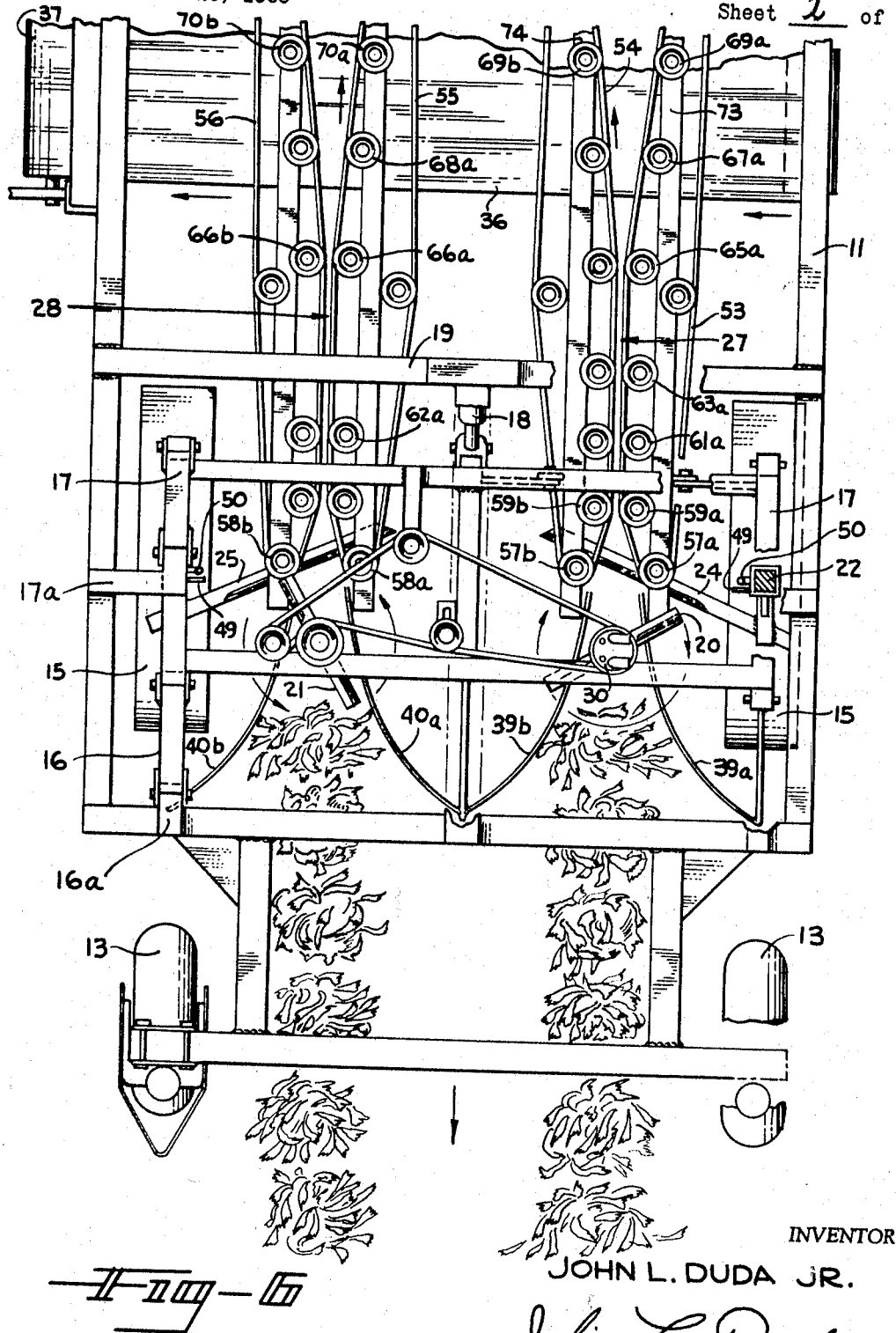

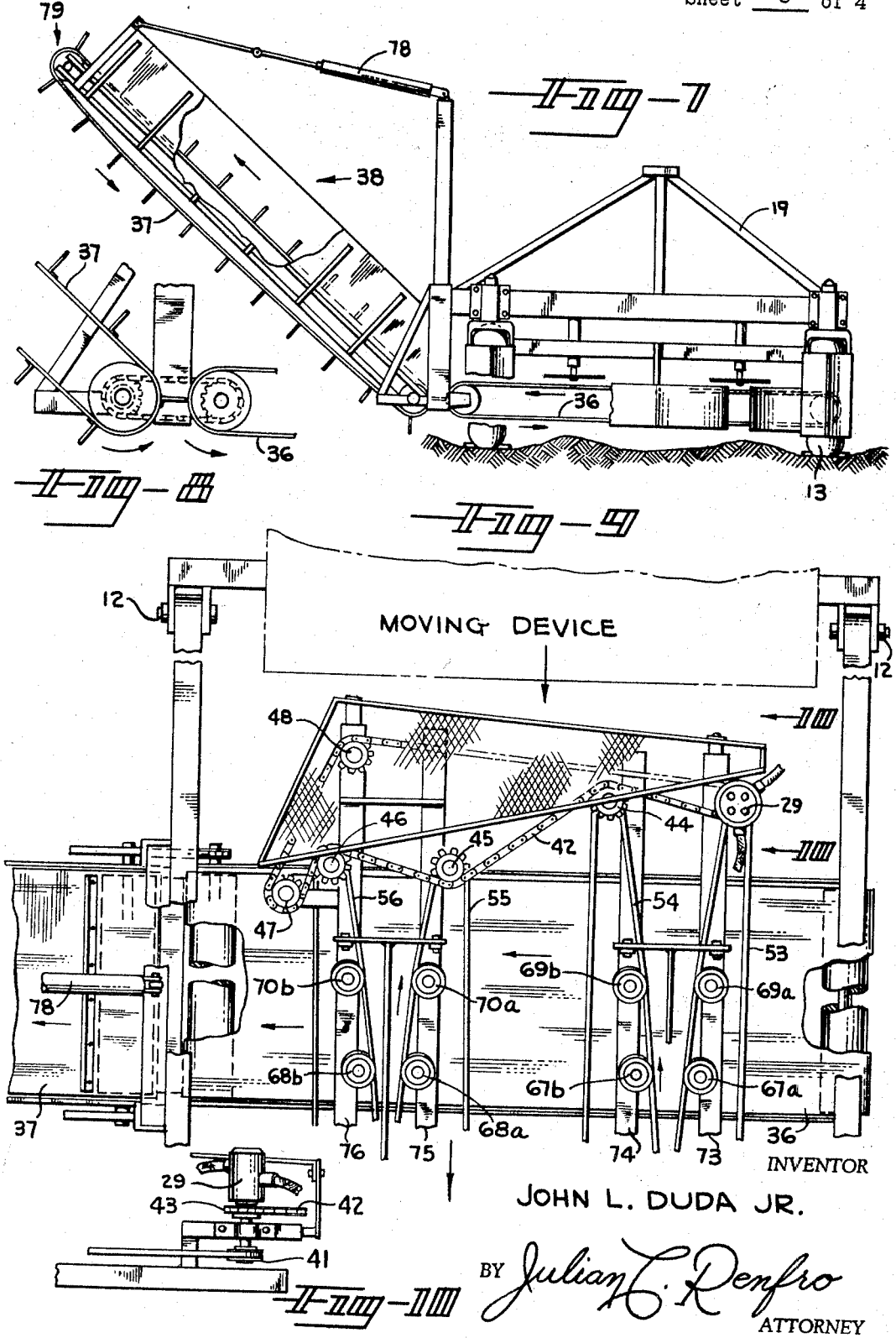

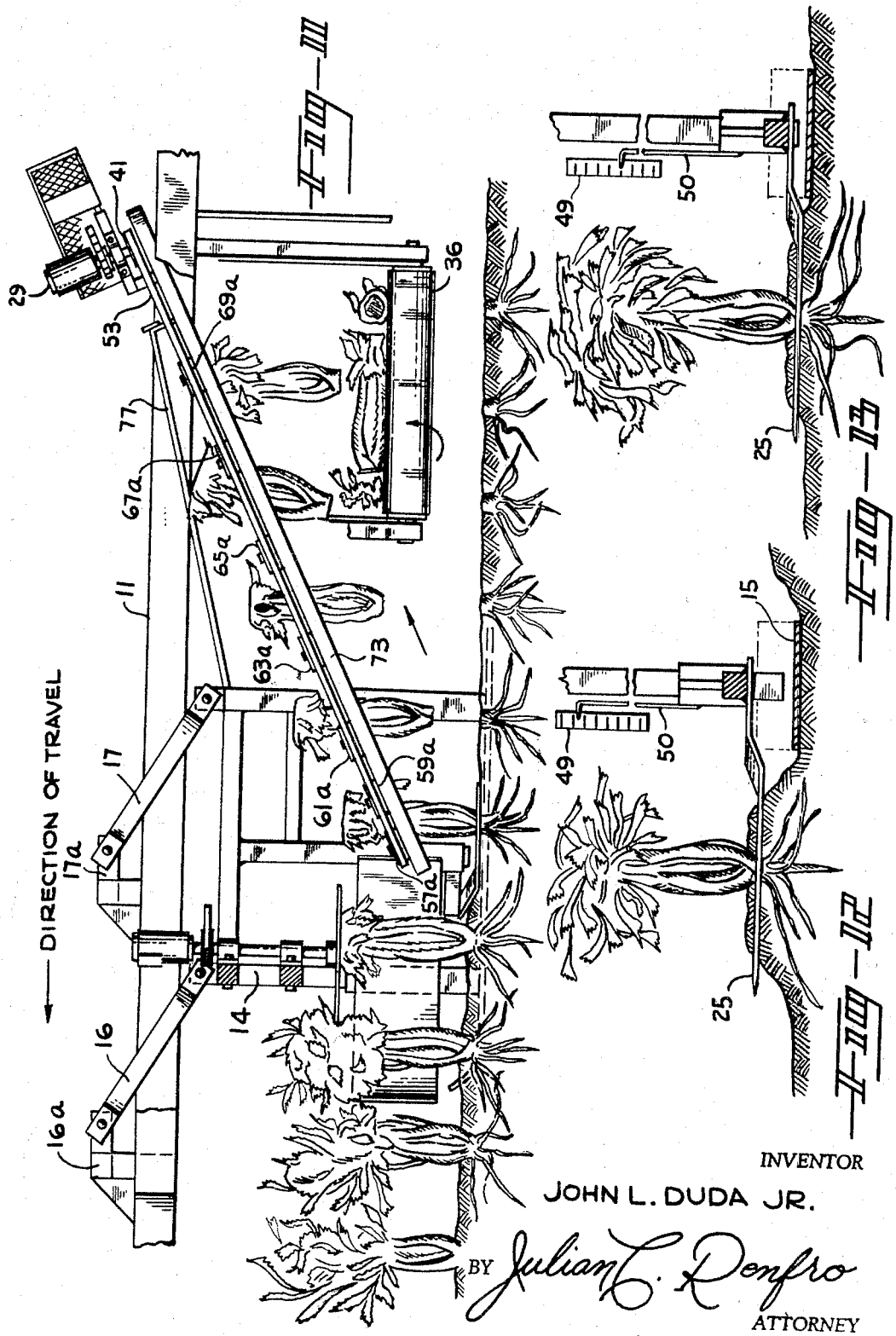

3,442,071
AUTOMATIC CELERY HARVESTING MACHINE
John L. Duda, Jr., Rte. 1, Box 91A,
Oviedo, Fla. 32765
Filed Oct. 23, 1965, Ser. No. 503,222
Int. Cl. A01d 45/00, 57/04, 75/22
U.S. Cl. 56—327         12 Claims

ABSTRACT OF THE DISCLOSURE

A harvesting machine adapted to harvest a crop such as celery and having a framework thereon that is vertically movable with respect to the remainder of the harvester, which framework can move to conform to ground contours. Cutoff blade means are provided on this vertically movable framework so that the blades will thus be maintained in a substantially constant relationship to the surface of the earth. Adjustment means are provided enabling the operator to individually adjust the blades heightwise on a moment-by-moment basis.

---

This invention relates to a machine for harvesting rows of plants from a field in a rapid, automatic manner, and more particularly to a novel harvester that enables the driver-operator to have precise control over the harvesting operation to such an extent that he can promptly and accurately make adjustments such as may be necessary in order for the celery or other plants to be severed at the correct location insofar as their root structures are concerned.

In the past, a number of automatic harvesting machines have been proposed, and these have included machines equipped with a plurality of rotatable cutting discs disposed so as to sever celery plants or the like from the ground. However, none of these prior art machines have been too satisfactory, for they have been expensive, as well as difficult to operate and maintain. Even more importantly, perhaps, such prior art machines have been unable to harvest crops such as celery so as to result in an item that can be profitably marketed.

One of the most satisfactory prior art machines for harvesting celery and the like was taught in the Duda Patent No. 2,647,525, issued Aug. 4, 1953, and assigned to the assignee of the present invention. That patent taught the use of a large, self-propelled harvesting machine upon or around which a force of up to some 65 laborers worked. This machine enabled the complete operations of harvesting, processing and packing to be accomplished on a single machine in the field, thereby eliminating many costly installations, such as washing, that were formerly employed in packinghouse operations. Although this earlier apparatus necessitated a considerable labor expense, it was nevertheless a far more profitable and practical arrangement than was possible utilizing the so-called automatic machines on the market inasmuch as the celery harvested in accordance with the cited patent was in manifestly saleable condition and equipment breakdown was rare.

The present invention represents a considerable advance over all of the machines mentioned above in that for the first time it enables the driver-operator to operate the harvester in the field and at the same time achieve fingertip control, so to speak, over the celery cutting operation, thus to enable with no additional labor expense the rapid, automatic harvesting of a consistently saleable product.

In accordance with this invention I provide a power-driven machine designed to straddle preferably two rows of celery at a time and to travel comparatively rapidly along such rows so as to quickly and easily accomplish the severing of the celery plant from its root structure at the optimum location. Other components of the machine accomplish the lengthwise sizing of the harvested product as well as the delivery of same to a storage vehicle or the like that may accompany the harvester.

A principal facet of this invention involves the use of a pair of elongated blades mounted in sweptback relationship and deployed so as to be drawn along the pair of rows of celery plants at selected depth so as to accomplish the severing of the plants from their roots at proper locations. The pair of blades are stationary in the sense of being nonrotative but quite significantly, a selective up or down positioning of the blades can be precisely and rapidly brought about by the driver-operator such that he can make immediate, accurate adjustments insofar as the cutting operation is concerned as soon as he has noted that the cuts appear to be occurring too high or too low.

In cooperative relation with the pair of angled blades I provide a pair of motor driven belt arrangements designed to grasp the stalks of celery as soon as they are severed from the ground, and to automatically deliver same to a moving conveyor belt located toward the rear of the machine. Each of these pickup belt arrangements comprises the use of a pair of endless belts driven in some what timed relation such that adjacent portions of the two belts are contiguous for substantial length. A stalk of celery caused to be grasped between the pair of belts is thus moved the entire length of the adjacent portions of the two belts and is delivered upwardly and rearwardly and thereafter dropped upon the conveyor belt. By this conveyor belt the celery is then carried to a second, upwardly inclined conveyor belt that may be arranged to drop the celery into a transporter vehicle.

It should be noted that a critical relationship exists between the positions of the blades and their respective belt arrangements for lifting the celery to the conveyor belt. This is because if the cutoff blades are set at the wrong sweepback angle, or are too forward or rearward with respect to the belt arrangement, the severed stalks of celery will not be picked up by the belt arrangement properly and will often fall to the ground.

Other facets of my novel harvesting machine include the deployment of the cutoff blades in the described vertically adjustable manner upon a framework, such framework being supported from the main frame of the machine by a parallelogram linkage. A pair of skis or runners are provided on the underside of the framework, which runners are of course spaced so as to be disposed outboard of the pair of celery rows being harvested. During harvesting operations, the framework is drawn along by the main frame, with the framework being permitted to "float" along over the surface contours of the celery field. An actuator mounted on the main frame is provided for moving the framework upwardly or downwardly with respect to the main frame of the harvester, thus to be enabled to transfer to the castered front wheels of the harvester, the weight of the framework for overland movement.

These and other objects, features and advantages will be more apparent from a study of the drawings in which:

FIGURE 1 is a side elevational view of my novel harvester, shown in substantially an operative position;

FIGURE 2 is a fragmentary view to a larger scale of the cutoff blade-supporting framework, with the blade as well as the framework being in their respective lowered positions;

FIGURE 3 is a fragmentary view somewhat relatable to FIGURE 2, but with the framework as well as the cutoff blade in their respective raised positions;

FIGURE 4 is a view taken along lines 4—4 in FIGURE 3 so as to reveal in full lines a cutoff blade in somewhat raised position in respect to the runner, and in dashed lines the lowered position of such blade;

FIGURE 5 is a top view relatable to FIGURE 4, revealing mounting details of a cutoff blade as well as the amount of sweepback typically employed therewith;

FIGURE 6 is a top view of the key portions of my harvester, revealing how the mid or active portions of the cutoff blades substantially coincide in position with an imaginary line drawn between the axes of rotation of the first pair of pulleys of the pickup belt arrangements;

FIGURE 7 is a front view of my harvester with certain portions removed so as to reveal key features of the invention;

FIGURE 8 is an enlarged fragmentary view of the conveyor detail, revealing how celery can be transferred from one belt to the other;

FIGURE 9 is a fragmentary top view of the machine generally representing a continuation of the details revealed in FIGURE 6;

FIGURE 10 is an enlarged fragmentary view taken along lines 10—10 of FIGURE 9 so as to reveal the pickup belt drive mechanism;

FIGURE 11 is a side elevation view drawn to large scale so as to reveal successively the topping, severing, pickup belt, and conveyor belt operations;

FIGURE 12 is an enlarged view revealing how the cutoff blade can be raised for the cutoff operation as the height of the plant warrants; this view and the related view showing how the sight gage arrangement reflects the blade position; and FIGURE 13 is a view related to FIGURE 12 but showing the blade in a lowered position for achieving cutoff at the correct plant height.

Turning to FIGURE 1 it will be seen that my novel harvester principally comprises a tractor 10 provided with an elongated frame 11 extending for a substantial distance in the direction of travel with respect to the tractor. The frame 11 is pinned to the tractor at opposite points 12 so that a degree of relative rotation of the frame 11 with respect to the tractor can take place.

A pair of castered wheels 13 are provided at the front end of the frame, which are used during roadway travel and for carrying the weight of frame 11 when the harvester is operating in the field. As will be noted in FIGURE 6, these wheels are spaced so as to straddle the rows of celery being harvested, the number of rows preferably being two.

As indicated in FIGURE 6, the rows of celery are disposed in a pre-established spaced relation, with the harvester being constructed to conform to such spacing. In other words, topping blades 20 and 21, and cutoff blades 24 and 25 are disposed to encounter celery stalks that are planted in rows spaced say 24" apart.

As will be apparent to those skilled in the art, shields 39a and 39b, and 40a and 40b are employed in such a configuration as in effect to define "passageways" that confine in a desirable manner the celery plants about to be harvested. This is to say, as revealed in FIGURE 6, as the outer limbs of the celery plant are pushed together, the rotary topping blades cut a portion of the tops off the stalks, thus to effect a heightwise sizing of the plants. These blades are driven by motor 30, which in turn drives a continuous belt that is so threaded past the pulleys of the rotary blades that latter blades desirably are driven in opposite rotative directions. Thereafter, the sweptback blades 24 and 25 sever the stalks from the ground in a manner to be described at greater length hereinafter.

The blades 24 and 25 are preferably mounted upon a blade-mounting framework 14, which is equipped on its underside with a pair of runners or skis 15 spaced identically to wheels 13. The arrangement is such that the framework 14 is relatively independent heightwise of the frame 11 during the harvesting operation, being principally supported at such times by the runners 15, which of course conform to the ground contours so as to give a highly desirable type of support for blades 24 and 25.

More precisely, the framework 14 is connected to frame 11 by a plurality of bars that in effect constitute a parallelogram linkage. As best seen in FIGURES 2 and 11, forward and rear bars 16 and 17, respectively, are connected at their upper ends to mounting arms 16a and 17a secured to frame 11. The lower ends of these bars are connected to upper corners of framework 14, and assure that the top of framework 14 remains basically parallel with the main frame 11 of the harvester. As revealed in FIGURE 6, a bar 16 and a bar 17 are disposed on both left and right sides of the device so as to assure proper connective relationship for each of the upper four corners of the framework 14, while at the same time allowing sufficient flexibility so that the framework 14, when supported by the skis 15, can closely follow the ground contour.

Referring to FIGURES 1 through 3, it will be noted that a vertical member 22, such as of square tubing, is mounted at an approximate midpoint of the framework 14, and upon member 22 a collar-like member 23 is disposed in slidable relation. As will be noted in these figures as well as in FIGURES 4 through 6, upon this collar member cutoff blade 24 is rigidly mounted, such as by welding. Similarly, cutoff blade 25 is mounted on the counterpart of vertical member 22, on the opposite side of framework 14. Quite significantly, the blades 24 and 25 are separately and selectively adjustable in the heightwise direction, as will now be discussed.

Actuator 26, such as a hydraulic actuator, is connected at an upper portion of framework 14, and extends downwardly to connect with an appropriate portion of collar member 23, as will be noted from FIGURES 2 and 3. When actuator 26 is extended to its full length as shown in FIGURE 2, the blade is in its lowermost position, as shown in latter figure and in dashed lines in FIGURE 4. However, when the actuator 26 has been operated in the direction such as to shorten its length, blade 24 is raised with respect to its runner 15, as shown in FIGURES 3 and 4. This construction is of course repeated on the opposite side of framework 14, and as will be discussed hereinafter, this is an important facet of my invention.

Separate actuators for the cutoff blades 24 and 25 and separate controls for these actuators enable the operator-driver to selectively manipulate these blades heightwise on a moment-by-moment basis so as to achieve at all times proper contact with the celery stalks being cut.

Reference to FIGURE 6 reveals that the cutoff blades 24 and 25 are each disposed in sweptback relation, with the angles these blades bear to the longitudinal axis of the harvester preferably being identical to each other or nearly so. As will be discussed hereinafter, the relationships these blades bear to the pickup belt arrangements 27 and 28 are critical and must be carefully adjusted if the oppositely moving belts of each of the pickup belt arrangements are to properly grasp the stalks of celery as they are severed from the ground.

FIGURES 1, 2, and 6 reveal the use of an actuator 18, such as a hydraulic actuator, that is employed for controlling the positional relationship of framework 14 with respect to frame 11. Actuator support structure 19 is so constructed upon frame 11 so as to assure a rigid mounting point for the upper end of actuator 18. Therefore, when the latter device is operated so as to decrease its length, by virtue of attachment of the lower end of the actuator to an upper central portion of the rear part of framework 14, the entire weight of the framework 14 is transferred to the frame 11, and of course taken off the runners 15. This operation is only resorted to at such times as the harvester is to be moved from one field to another or over roadways, for during harvesting operations, the weight of framework 14 is borne upon runners 15.

The operator-driver sits in seat 31 in a direction in which he can face the direction of travel of the harvester and at the same time clearly observe the stalks of celery being severed by each of the blades 24 and 25. Customary tractor operating levers 32 and 33 are provided for the operator's use in making corrective movements to the left or right during the harvesting operation, and hydraulic controls 34 and 35 are disposed nearby and positioned in such a manner that the operator can easily maintain his hand on these controls during the operation. By appropriate manipulation of these controls, the blades 24 and/or 25 may be appropriatedly moved on a moment-by-moment basis so as to bring about proper celery severing operations. A sight gage arrangement constituted by gage 49 mounted on framework 14 and pointer 50 mounted on member 23 are provided on each side of the machine to enable the relative height of each cutoff blade to be quickly ascertained.

Other controls, not shown, enable the operator-driver to control the rotation of topping blades 20 and 21, the heightwise positioning of the conveyor belt unit 38, the raising of the framework 14, and the like.

Although I have shown all of the actuators on my harvester to be hydraulic devices, it is to be understood that such is not required, for electric screw jacks and electric motors or some other alternative devices could be utilized if desired. I prefer the use of hydraulic actuators and hydraulic motors because of their ruggedness and because of the availability of high pressure hydraulic fluid from an appropriate pump on the tractor 10.

As previously mentioned, by the appropriate manipulation of actuator 18, the weight of framework 14 may either be transferred to frame 11, or alternatively allowed to remain on skis or runners 15. In order that the framework 14 can move freely with respect to the frame 11 as the skis 15 conform to the contours alongside the rows of celery plants, I utilize hydraulic controls that have a "float" position thereon. Such a control for example is made by the Gresen Company of Minneapolis, Minn., model No. 2711. This four position hydraulic control valve has up, neutral, down, and float positions, and when in the float position, the control allows the hydraulic fluid in the ends of the actuator 18 to freely come and go from the actuator, in this manner allowing the framework 14 to undertake fore and aft tilting movements as may be necessary. As a separate matter, I deliberately utilize oversize boltholes in the bars 16 and 17 at the locations where the bolts from framework 14 are received, so that the framework 14 can undertake left and right tilting movements as well, as the ground contours may dictate.

It is a fact that in certain celery fields, some of the rows of celery plants are alongside "roadways" over which various vehicles pass, such as the vehicles utilized for fertilizing the fields. Therefore, there are instances in which the runner 15 on one side of the framework 14 is operating in a furrow that is significantly higher or lower than that of the other runner. Therefore, in order to avoid a situation in which the framework 14 is continuously tilted to a marked degree, I provide for allowing the runner on the low side to be dropped an appropriate amount with respect to the other. This is accomplished as shown in FIGURES 2 and 3 by providing a hand operated tightening bolt-and-collar arrangement, which enables the degree of vertical telescoping between the upper and lower members of framework 14 to be controlled. It should be noted, however, that this does not affect the positioning of the cutoff blades, for they are mounted upon members 22 that are secured only at their upper ends to the framework 14.

As previously mentioned, the pickup belt arrangements 27 and 28, best seen in FIGURES 6 and 9, are located so as to grasp the severed stalks of celery as they are cut from the ground by the cutoff blades 24 and 25. That this goal may be accomplished, the relative positioning between the cutoff blades and their respective pickup belts is such that a portion of the cutting edge of blade 24 coincides with a midpoint of an imaginary line extending between the first or forwardmost pair of pulley 57a and 57b of pulley arrangement 27. Blade 25 is similarly placed with respect to pulleys 58a and 58b. These factors, coupled with the topping blades being designed to rotate in opposite directions and in directions that are consistent with the direction of sweepback of the cutoff blades enables my harvester to properly encounter and grasp the severed celery stalks in a most consistently satisfactory manner.

The pickup belt arrangements 27 and 28 are preferably driven by a common motor 29 visible in FIGURES 9, 10, and 11. Although another form of rotary driving means could be employed for this purpose if desired, I prefer the use of a rotary type hydraulic motor driven from the supply of high pressure hydraulic fluid furnished through high pressure hoses extending from the tractor.

A sprocket 43 (FIGURE 10) is disposed on one part of the shaft extending from motor 29, and a pulley 41 is disposed on the shaft below this sprocket. A suitable chain 42 extends around sprocket 43 as well as around sprockets 44, 45, 46, 47 and 48, as best seen in FIGURE 9. On the same shaft with sprockets 44, 45 and 46 are pulleys (not shown) which are comparable to pulley 41. Each of these latter pulleys serve as the driving means for the belts 53, 54, 55 and 56 depicted in FIGURES 6 and 9.

As will be apparent, the chain 42 is deployed about the sprockets 43, 44, 45 and 46 in such a manner that belts 53 and 54 turn in opposite directions to each other, and belts 55 and 56 turn in opposite direction to each other. This of course is done in order that the portions of belts 53 and 54 disposed closely adjacent each other for some distance as depicted in FIGURE 6 will be moving in what may be regarded as timed relationship. This is of course desirable so that the stalks of celery entering into the V-shaped "entrance" to the pickup belt arrangement 27 for example will be held between belts 53 and 54 without any appreciable rotation of the stalk being involved.

Some four pairs of pulleys are shown disposed along the parallel portions of belts 53 and 54, these pulleys being 59a and 59b, 61a and 61b, 63a and 63b, and 65a and 65b. The odd numbered pulleys bearing the a suffix are supported upon elongated support members 73 by the use of spindles that are spring biased in the direction such as to cause the belt 53 in the region of pulleys 59a, 61a, 63a and 65a to be biased to the left so as to be held close to belt 54. Similarly, the odd numbered pulleys bearing the b suffix are mounted on support member 74 and bias belt 54 to the right, so that it resides close to belt 53. Obviously, the spring force associated with these pairs of pulleys in order to hold the straight portions of belts 53 and 54 in contiguous or almost contiguous relation is sufficiently low that the various pairs of pulleys can move apart in order to accommodate therebetween the frequent passage of celery stalks being transported to the conveyor belt 36. After the pair of pulleys 65a and 65b, the pairs of pulleys 67a and 67b are spaced somewhat apart, and the succeeding pair 69a and 69b spaced yet further apart so as to define a diverging arrangement that will allow the celery stalks to drop away from belts 53 and 54 and fall upon the moving conveyor belt 36. The pulleys associated with the pickup belt arrangement 28 which bear even numbers, will be noted to perform functions similar to their odd-numbered counterparts. These latter pulleys are of course mounted on members 75 and 76 and spring biased so as to enable belts 55 and 56 to accomplish the transporting of the severed stalks of celery from a location adjacent the blade 25 to the moving conveyor belt 36. Such details are perhaps best seen as depicted in FIGURE 11 wherein the topping, severing and stalk transporting operations are to be seen in successive portions of FIGURE 11.

As also to be noted in latter figure, the pulley mounting members, such as member 73 are revealed to be secured to framework 14 so as to move upwardly or downwardly therewith in response to actuations of actuator 18. Because of the weight of the pickup belt arrangement, it is usually desirable to have one or more brace members 77 extending from an upper portion of framework 14 to a point near the top of the belt arrangement so as to assure that the belt arrangement does not deflect downwardly in an undesirable manner. FIGURE 11 also reveals the comparative low position of conveyor belt 36 below the frame, this positioning of course being dictated by the need for this unit to catch the severed stalks dropped from pickup belt arrangements 27 and 28. As seen in FIGURES 7, 9, and 12 conveyor belt 37 is disposed adjacent the end of lower conveyor belt unit 36 so as to receive the stalks of celery therefrom. The belt 37 is equipped with a number of paddle-like members spaced about the full extent of its outer surface so that celery can be transported to the top of the unit 38, despite the fact that it may be deployed at a steep angle such as shown in FIGURE 7 as a result of the operation of actuator 78. Celery dropping from the top of belt 37 falls into a truck or other vehicle driven or pulled alongside.

Proper operation of the belts 36 and 37 is achieved by a hydraulic motor 79 located at the upper end of unit 38 which motor is of course connected with the high pressure hydraulic source by means of high pressure lines (not shown). Rotary motion is transferred from belt 37 to belt 36 by means of a sprocket and chain arrangement as shown in FIGURE 8.

As will now be apparent to those skilled in the art, I have provided a novel harvester that achieves the rapid, highly satisfactory harvesting of crops such as celery, this being achieved at a minimum labor cost and with a minimum amount of the wastage that was prone to occur in the so-called automatic machines of the prior art.

Although I am obviously not to be limited to same, I prefer the use of a Diesel-powered Crawler tractor as depicted in FIGURE 1, with there being disposed thereon a pump for supplying sufficient quantities of hydraulic fluid for the operation of the various motors and actuators described hereinabove. For example, the pump may supply through appropriate high pressure lines 25 gallons of hydraulic fluid per minute at a pressure of 1000 p.s.i. to 1800 p.s.i.

The various actuators used may be of a type manufactured by the Cross Company of Lewis, Kans. For example the actuators 26 used to position the cutoff blades may be actuator model No. 1504-DA having a 1½ inch piston and a 4" stroke whereas the actuator 18 used for positioning the framework 14 may be model No. 218-DA.

The pickup belt arrangements may be powered by a motor 29 known as an Orbit motor, stated by the manufacturer to be subject of Reissue Patent No. 25,291. However, it will be apparent that the foregoing are cited by way of example only, and manifestly I am not to be limited thereto.

As to blades 24 and 25, I prefer these to be made of steel, to be welded to the members 23, to be of a length of approximately 24 inches, and to have a sweepback of approximately 38 degrees. Again, this information is cited by way of example and I am not to be limited thereto.

Other utilizations of my invention may appear obvious to those skilled in the art, and I, therefore, am not to be limited to the enclosed details.

I claim:

1. A harvester designed to travel along a row of plants and to sever same from the ground, said harvester comprising a floating framework, said framework being suspended so as to be vertically movable with respect to the remaining portion of said harvester, a lower portion of said framework being in contact with the ground and maintaining a preestablished relationship with the ground despite surface irregularities, cutoff blade means mounted on said framework arranged to sever the plants at the correct location as said harvester proceeds over the ground, the vertical repositioning of the framework as the ground contour changes thus bringing about an appropriate positioning of said cutoff blade means with respect to the plants without intervention by the operator of said harvester.

2. The harvester as defined in claim 1 in which height adjustment means are provided for bringing about a heightwise adjustment of said cutoff blade means relative to said framework, said height adjustment means being under the control of the operator of the harvester so that corrections of blade height can be brought about on a moment-by-moment basis, thus assuring the severing of the plants without damage thereto, as well as assuring that too much root structure does not remain thereon.

3. A harvester for automatically harvesting plants that have been planted in rows, said harvester comprising a floating framework that is suspended so as to be vertically movable relative to the rest of the harvester, means on the underside of said floating framework in contact with the ground so that as the contour of the ground changes, said framework can move to closely follow same, cutoff blade means mounted on said framework for severing plants from the ground, which cutoff blade means is thus automatically and consistently positioned with respect to the surface of the ground, and means for adjusting heightwise the relationship of said cutoff blade means with respect to said framework so that an operator can assure on a moment-by-moment basis that the plants are being severed from the ground so as neither to damage the plant nor as to leave too much root structure remaining thereon.

4. The harvester as defined in claim 3 in which topping means are also provided on said framework, said topping means being placed so as to cut the plants to a consistent height prior to the severing of the plants from the ground by said cutoff blade means.

5. A harvester as defined in claim 3 in which pickup means are provided for engaging in picking up the plants as they are severed from the ground by said cutoff blade means, said pickup means also being supported from said framework.

6. A harvester arranged to travel along rows of plants so as to accomplish the automatic harvesting of same comprising a main frame, a suspended framework attached to said main frame and capable of relative vertical movement with respect thereto, a portion of said framework being in contact with the ground so that said framework can substantially conform to the contours of the ground over which the harvester passes, and cutoff blade means mounted upon said framework so as to maintain a substantially constant relationship with the ground, said cutoff blade means being substantially horizontally disposed with respects to the ground and possessing substantial sweepback with respect to the direction of the travel of the harvester, said cutoff blade means being automatically and consistently vertically positioned for proper cutoff of plants as a result of the floating action of said framework, and means for enabling the vertical height of said cutoff blade means to be adjusted with respect to said framework on a moment-by-moment basis so that a highly satisfactory severing of the plants from the ground can be achieved.

7. The harvester as defined in claim 6 in which a pair of runners are provided on the underside of said framework, said runners forming the principal support for said framework when it is performing a harvesting operation.

8. The harvester as defined in claim 6 in which blade means are provided on said framework for performing a topping action on the plants being harvested, said cutoff blade means being arranged to sever the plants from the ground subsequent to said topping operation.

9. A harvester arranged to travel along a pair of rows of plants so as to accomplish the automatic harvesting of same comprising a main frame, a pair of wheels mounted on the front of said frame and spaced so as to straddle the pair of rows being harvested, a framework attached to said main frame, and capable of relative vertical movement with respect thereto, a pair of runners on the bottom of said framework spaced apart approximately the same distance as said wheels, said framework thus being enabled to substantially conform to the contours of the ground over which the harvester passes, means on said harvester for achieving a topping action on the plants being harvested, a pair of cutoff blades arranged to sever the plants from the ground subsequent to said topping operation, each of said cutoff blades being substantially horizontally disposed with respect to the ground and possessing substantial sweepback with respect to the direction of travel of said harvester, and means for enabling the vertical height of said cutoff blades to be adjusted on a moment-by-moment basis so as to achieve a highly satisfactory severing of the plants from the ground.

10. The harvester as defined in claim 9 in which a pickup belt arrangement is provided in connection with each of said cutoff blades, said pickup belt arrangements being arranged to grasp each plant as it is severed and to transport same to another location on said harvester.

11. The harvester as defined in claim 10 in which at least one conveyor belt is provided on said harvester for receiving the plants from said pickup belts.

12. The harvester as defined in claim 11 in which said cutoff blade height adjustments, the operation of said pickup belts, and the operation of said conveyor belt are each powered from a common source of hydraulic power

References Cited

UNITED STATES PATENTS

| | | | |
|---|---|---|---|
| 975,586 | 11/1910 | Wadhams | 56—121.44 |
| 1,071,794 | 9/1913 | Rasey | 56—121.44 |
| 1,075,884 | 10/1913 | Weaver | 171—61 X |
| 1,193,746 | 8/1916 | Winters | 171—61 |
| 1,457,829 | 6/1923 | Erhardt | 56—121.46 |
| 1,651,030 | 11/1927 | Kowalsky | 56—121.46 |
| 1,748,745 | 2/1930 | Zuckerman | 56—25.4 |
| 2,368,895 | 2/1945 | Spiegl | 171—62 X |
| 2,522,308 | 9/1950 | Silva | 56—327 X |
| 2,645,889 | 7/1953 | Warner | 171—62 X |
| 2,679,716 | 6/1954 | Dunkle | 171—62 X |
| 2,681,538 | 6/1954 | Flansaas | 56—23 |
| 2,709,602 | 5/1955 | Orr | 56—208 X |
| 2,791,083 | 5/1957 | Richardson | 171—61 X |
| 2,833,357 | 5/1958 | Lust | 171—37 |
| 3,168,145 | 2/1965 | Gunkel et al. | 171—61 |

ALDRICH F. MEDBERRY, *Primary Examiner.*

U.S. Cl. X.R.

56—121.46, 238; 171—38, 61